(12) United States Patent
Dey et al.

(10) Patent No.: US 12,057,007 B2
(45) Date of Patent: Aug. 6, 2024

(54) ALARM PERFORMANCE OPTIMIZER (71) Applicant: Honeywell International Inc., Charlotte, NC (US)

(72) Inventors: Satrujeet Dey, Bangalore (IN); Srikant Srinivasan, Balgalore (IN); Senthilkumar Kumarasamy, Tamilnadu (IN); Anmol Chowdhary, Delhi (IN)

(73) Assignee: Honeywell International Inc., Charlotte, NC (US)

( * ) Notice: Subject to any disclaimer, the term of this patent is extended or adjusted under 35 U.S.C. 154(b) by 112 days.

(21) Appl. No.: 17/965,234

(22) Filed: Oct. 13, 2022

(65) Prior Publication Data

US 2023/0112875 A1 Apr. 13, 2023

(30) Foreign Application Priority Data

Oct. 13, 2021 (IN) .............................. 202141046813

(51) Int. Cl.
*G08B 29/02* (2006.01)
*G06F 3/0482* (2013.01)
(52) U.S. Cl.
CPC ........... *G08B 29/02* (2013.01); *G06F 3/0482* (2013.01)
(58) Field of Classification Search
CPC .............................. G08B 29/02; G06F 3/0482
See application file for complete search history.

(56) References Cited

U.S. PATENT DOCUMENTS

| | | | | |
|---|---|---|---|---|
| 7,557,702 B2* | 7/2009 | Eryurek | ............... | G05B 23/027 340/8.1 |
| 10,943,467 B1* | 3/2021 | Speed | ..................... | G06F 9/451 |
| 11,451,611 B1* | 9/2022 | Saunders | ................ | H04L 41/28 |
| 2015/0281453 A1* | 10/2015 | Maturana | ............... | G06F 9/5072 379/265.12 |
| 2016/0155098 A1* | 6/2016 | McElhinney | ......... | G06F 11/079 705/305 |
| 2018/0114414 A1* | 4/2018 | Law | ......................... | G08B 5/22 |
| 2018/0159756 A1* | 6/2018 | Matthews | ............... | H04L 67/02 |

* cited by examiner

*Primary Examiner* — Mohamed Barakat
(74) *Attorney, Agent, or Firm* — Alston & Bird LLP (57) ABSTRACT

Various embodiments for an alarm performance optimizer are disclosed. An embodiment operates by receiving information about a status of each of a plurality of alarm configurations monitored by a control system. Calculating one or more alarm configuration health metrics based on the received information. The calculated one or more alarm configuration health metrics are displayed in a user interface. A first action that will increase a value of a first alarm metric of the one or more alarm configuration health metrics is identified. The first action is displayed on the user interface. A selection of the first action is received via the user interface. The user interface is updated to display additional details about a subset of the plurality of alarm configurations associated with the first action.

20 Claims, 9 Drawing Sheets

ALARM PERFORMANCE OPTIMIZER

CROSS-REFERENCE TO RELATED APPLICATIONS

This application claims priority to Indian Patent Application No. 202141046813 titled "Alarm Performance Optimizer", to Dey et al., filed on Oct. 13, 2021, which is herein incorporated by reference in its entirety.

BACKGROUND

Alarm systems are integral and important systems in facilities management. Alarms notify operators, engineers and facilities managers when systems are degrading, need attention, or are in need of repair. Alarms can help prevent accidents, keep people safe, and help keep a facility operational if properly maintained. As such, it is important to be able to effectively and efficiently manage and maintain the various alarms across different equipment in a facility. However, alarm maintenance and management are often a manual and tedious tasks that are performed without much direction or oversight. These difficulties inevitably costs an organization time, money, uptime, productivity, and may even endanger the safety of their employees and other people.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Alarm systems are integral and important systems in facilities management. Alarms notify operators, engineers and facilities managers when systems are degrading, need attention, or are in need of repair. Alarms can help prevent accidents, keep people safe, and help keep a facility operational if properly maintained. As such, it is important to be able to effectively and efficiently manage and maintain the various alarms across different equipment in a facility. However, alarm maintenance and management are often a manual and tedious tasks that are performed without much direction or oversight. These difficulties inevitably costs an organization time, money, uptime, productivity, and may even endanger the safety of their employees and other people.

Figure 1:
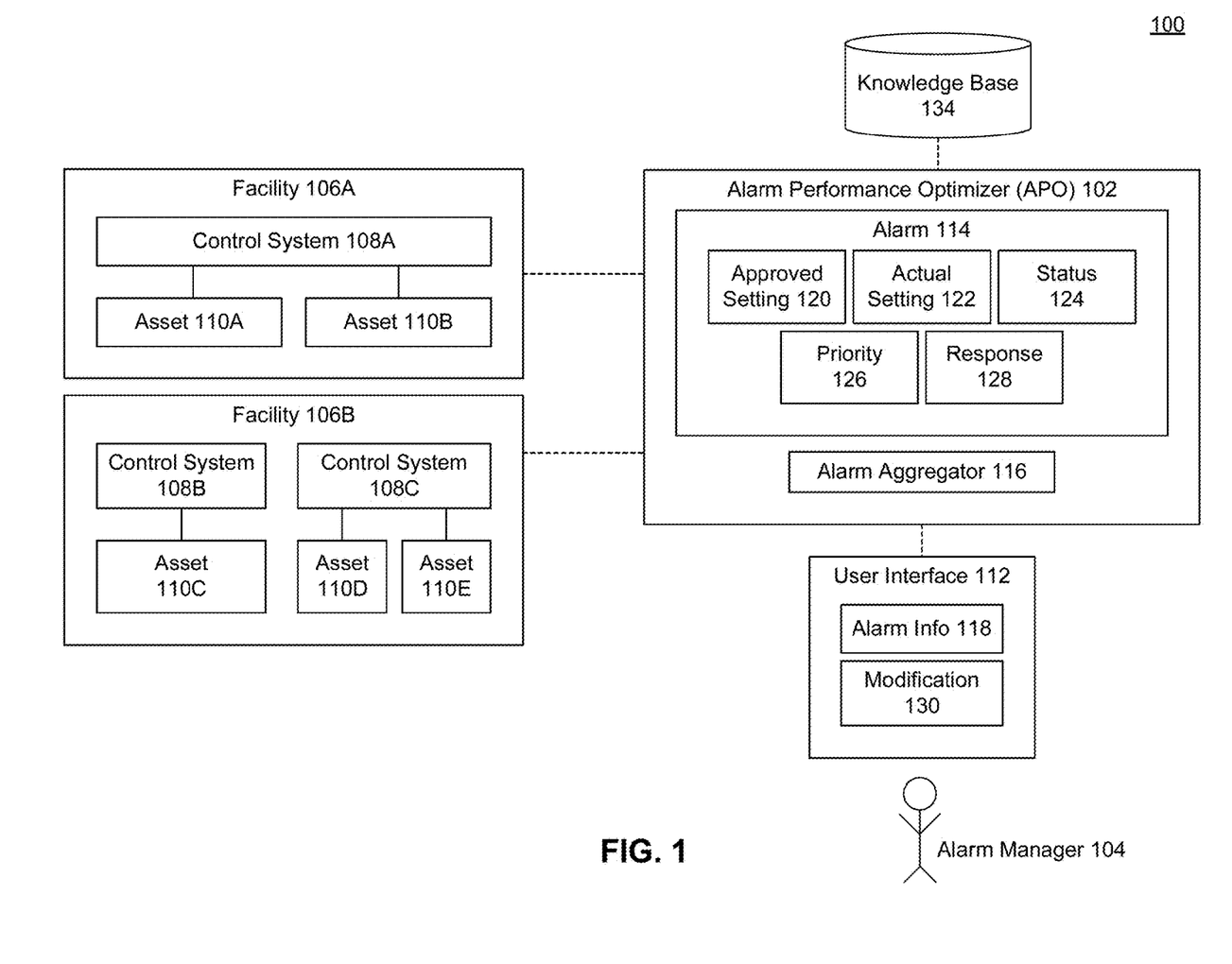
FIG. 1 illustrates a block diagram of an alarm performance optimizer (APO), according to some example embodiments.

FIG. 1 illustrates a block diagram of an alarm performance optimizer (APO) 102, according to some example embodiments. APO 102 may enable an alarm manager 104 to manage the alarm systems across different facilities 106A, 106B, different control systems 108A-C, and/or different assets 110A-E, all from a single user interface 112.

The facilities 106A, 106B (referred to herein generally as facility 106) may be buildings, worksites, campuses, portions of a building, or any other geographic location that includes one or more assets 110A-C (referred to herein generally as asset 110). An asset 110 may be any machinery, equipment, or system that is used as a particular facility for which alarms may be used to monitor its functionality. Example assets 110 include, but are not limited to, storage tanks, air conditioning units, chemical reactors, distillation columns, boilers, heat pumps, drainage systems, hydraulic presses, fans, radiators, plumbing systems, air purification systems, etc.

In some embodiments, each asset 110 may be connected to one or more control systems 108A-C (referred to herein generally as control system 108). Control system 108 may include any system that is used to monitor the performance or functionality of one or more assets 110. Control system 108 may either receive performance information from an asset 110 or may direct monitor the functionality of assets 110 to collect performance information. In some embodiments, the control systems 108 may include alarms 114 that are used to notify facility managers, operators, engineers, or other personnel when a malfunction is detected at any of the assets 110. In some embodiments, an asset 110 may have its own built-in control system 108, while other assets 110 share a control system 108 that may be used to monitor or manage the alarms across various similar or dissimilar assets 110.

In some embodiments, an asset 110 will have one or more tags or measurements (not shown). These tags or measurements may have alarms 114, such that when the measurements exceed particular alarm configuration parameters, the alarm may be triggered. For example, an alarm 114 may be triggered when an asset 110 stops working, or when its metrics or readings exceed an expected or desired range of performance. If asset 110A is a liquid tank, and its expected fill level may be 80%, an alarm 114 may be triggered when/if the fill level exceeds 85%. The triggering of the alarm when the fill level exceeds 85% is controlled by alarm configuration settings which are adjustable through a user interface 112 of APO 102. As used herein, the terms "alarm" and "alarm configuration" may be used interchangeably.

In a traditional facilities environment, a facilities manager would need to be physically located at the facility and walk around and manage the various alarm systems in a particular building or location, often with regard to each individual piece of equipment. Not only is this both a resource and time intensive process, that is prone to human errors, but also there are no way to measure or manage how the overall alarm responses are being maintained. For example, there would be no way to know how many alarms are active at a facility at any given time, the nature of the alarms, and there would be no way to adjust the alarms without individually and/or manually configuring each control system.

APO 102 addresses these and other issues with general alarm maintenance, and optimizes or improves alarm maintenance and management by connecting to different control systems 108 and aggregating the various alarm configuration information into a single user interface 112. APO 102 may also generate or calculate various alarm system configuration metrics, which may have been otherwise unavailable, and that may be used to better manage the alarms 114 across various facilities 106, control systems 108, and assets 110. APO 102 may both simplify alarm maintenance and improvement, and create for a safer and more efficient work environment across various facilities 106.

In some embodiments, an alarm aggregator 116 may be a system or computing device that collects, receives, or retrieves information from the various control systems 108A-C to which APO 102 is communicatively coupled. The collected alarm information 118 may be processed by APO 102 and presented via user interface 112 for an alarm manager 104.

Some example alarm information 118 (which may include alarm configuration information) that may be collected and presented via user interface 112 for various alarms 114 includes, but is not limited to, an approval setting 120, an actual setting 122, a status 124, a priority 126, and a response 128. Each alarm 114 may also have its own identifier or name and/or location information, which may indicate to which facility 106, control system 108, and asset 110 the alarm 114 corresponds.

Approved setting 120 may be a pre-approved or pre-configured alarm setting for a particular asset 110C. For example, a particular facility 106B may need to be maintained at a temperature less than 70 degrees. A safety panel of one or more engineers may decide that the alarm 114 for the thermostat 110C in the facility 106B should be set to 71 degrees, which may be the approved setting 120.

Actual setting 122 may be an actual alarm setting at the thermostat 110C or control system 108B connected to the thermostat 110C which may be changed by facility managers or other employees authorized and/or present at or responsible for facility 106B. For example, an engineer in the facility 106B, may reset or change the alarm 114 to go off at 73 degrees, which may be the actual setting 122.

In some embodiments, APO 102 may flag this variance between the approved setting 120 and the actual setting 122 of the temperature alarm 114 for the thermostat 110C at facility 106B. APO 102 may notify alarm manager 104 of this variance between an actual setting 122 and approved setting 120 even if the actual temperature in the facility is 68 degrees, and thus there is no malfunction or warning with the actual thermostat 110C.

The alarm manager 104 may then inquire or decide what to do about the variance, and may adjust the alarm configuration settings (if needed) via user interface 112. For example, the engineer who changed the temperature may have included a note, which may be received and displayed through user interface 112, that the change was made because of a faulty temperature gauge. Alarm manager 104 may then approve, disapprove, or change the alarm setting for the thermostat 110C directly from user interface 112 by providing a modification 130.

Modification 130 may be any change to an alarm setting or alarm information 118 made via user interface 112. Modifications 130 may be communicated to control systems 108 to update the corresponding alarm systems. In some embodiments, a modification 130 may need to be approved by another user or supervisor, who may be notified when an modification 130 has been submitted by alarm manager 130. Through user interface 112, the supervisor may then approve or disapprove the modification 130. The user interface 112 may then be updated to indicate the variance between approved setting 120 and actual setting 122 (if it still exists) was approved or resolved. If the modification 130 changes the value of the alarm, this may be logged by APO 102 in a history or log tracking changes to alarm settings.

Status 124 may indicate whether the current settings of an alarm 114 have been approved. Status 124 may be used to detect and flag for an alarm manager 104, unauthorized changes to the settings of an alarm 114. For example, status 124 may indicate whether the current settings (e.g., actual setting 122) of an alarm 114 falls within an approved setting 120 or has otherwise been approved (if falling outside the approved setting 120). So, for example, if an alarm actual setting 122 value is changed to be outside of an approved setting 120 range, then the status 124 may change to unapproved setting. The alarm manager 104 or other user may then review the alarm 114, confer with an engineer or operator at the facility 106 to inquire why the setting was changed. APO 102 may allow the alarm manager 104 to then either approve the deviation or change the actual settings 122 and/or approved settings 120 of the alarm 114 via user interface 112. Any of these actions via user interface 112 may then update the status 124 of the alarm 114.

Priority 126 may indicate a priority of the particular alarm 114. Example priorities include low, medium, high, urgent. In some embodiments, priority 126 may indicate a date/time by which the alarm 114 needs to be resolved or acted upon (if activated) or may include a countdown time for how much time remains before the alarm needs to be resolved. In some embodiments, priority 126 may indicate a priority of the status 124, or settings deviation, and may indicate whether the deviation is urgent, high, medium, or low priority.

Priority 126 (and priority distributions across multiple alarms 114) may indicate to an alarm manager 104 a general safety of the system, and how likely the current settings are to prevent or result in undesirable consequences. For example, there should be few or fewer urgent or high priority 126 alarms 114 relative to low or medium priority 126 alarms 114. If the distribution of urgent or high priority 126 alarms 114 increases or passes a particular threshold, this could be cause for concern for an alarm manager 104 who may then need to act to prevent any potential accidents, safety issues, or other undesirable consequences. In some embodiments, this action may include shutting down a particular asset 110 or facility 106 of equipment until the (urgent and/or high priority 126) alarms 114 can be addressed or resolved.

Response 128 may indicate what action(s) should be taken to resolve the activated alarm 114. For example, in the thermostat example referred to above, response 128 may indicate that an operator or engineer should lower the temperature, check the coolant, and disconnect and reconnect the thermostat. In some embodiments, this response information 128 may be retrieved from a knowledge base 134.

Knowledge base 134 may include a repository of information about how to deal with various alarms, and may include steps to address alarms, reasons for providing the alarm 114, impact of the alarm 114, the names of vendors to contact and their contact information, video tutorials, links to additional information such as documents or standard operating practices, etc. This response information 128 may be made accessible to the operator, engineer or other facility manager who may be tasked with addressing an activated alarm 114.

In some embodiments, APO 102 may indicate to alarm manager 104, through user interface 112, which alarms 114 include response information 128, and which ones do not yet include any response information 128. In some embodiments, APO 102 may further indicate when was the last time the response information 128 was updated, and by whom the update was submitted.

For example, a particular organization may have a policy that response information 128, priority 126, or other alarm information 118 may need to be updated or reviewed every three years. If response 128 for the thermostat was last updated five years ago, APO 102 may flag this variance for an alarm manager 104, which may help improve alarm maintenance and management. The alarm manager 104 may then act on the old response 128.

In some embodiments, APO 102 may provide statistics or graphics on user interface 112 indicating how many and which alarms include outdated response information 128, up-to-date response information 128, or even no response information 128. APO 102 further may indicate or flag for alarm manager 104 if these statistics are in line or out of line with a corporate or organizational policy. For example, if the corporate policy is to have no more than 25% of the alarms missing response information 128, and the current statistics indicate that 33% of the alarms do not have response information 128, this may be indicated on user interface. The alarm manager 104 may then use user interface 112 to identify which alarms 114 are missing response information 128, and may even update response information 128 directly from user interface 112. APO 102 may then update the statistics in real-time in user-interface 112 as new response information 128 is detected.

The user interface 112 of APO 102 may enable or provide a guided workflow for end users, such as an alarm manager 104, to identify the health of various systems with respect to alarm configuration metrics. Additionally, APO 102 may display the alarm information from various facilities 106A-C, identify and highlight or flag which assets 110 need the most urgent attention, and generate and display tasks to improve the health of the alarm system. APO 102 may also enable the alarm manager 104 or other user to act on the identified issues through the user interface 112 and update alarm statuses and configurations as may be needed.

Figure 2:
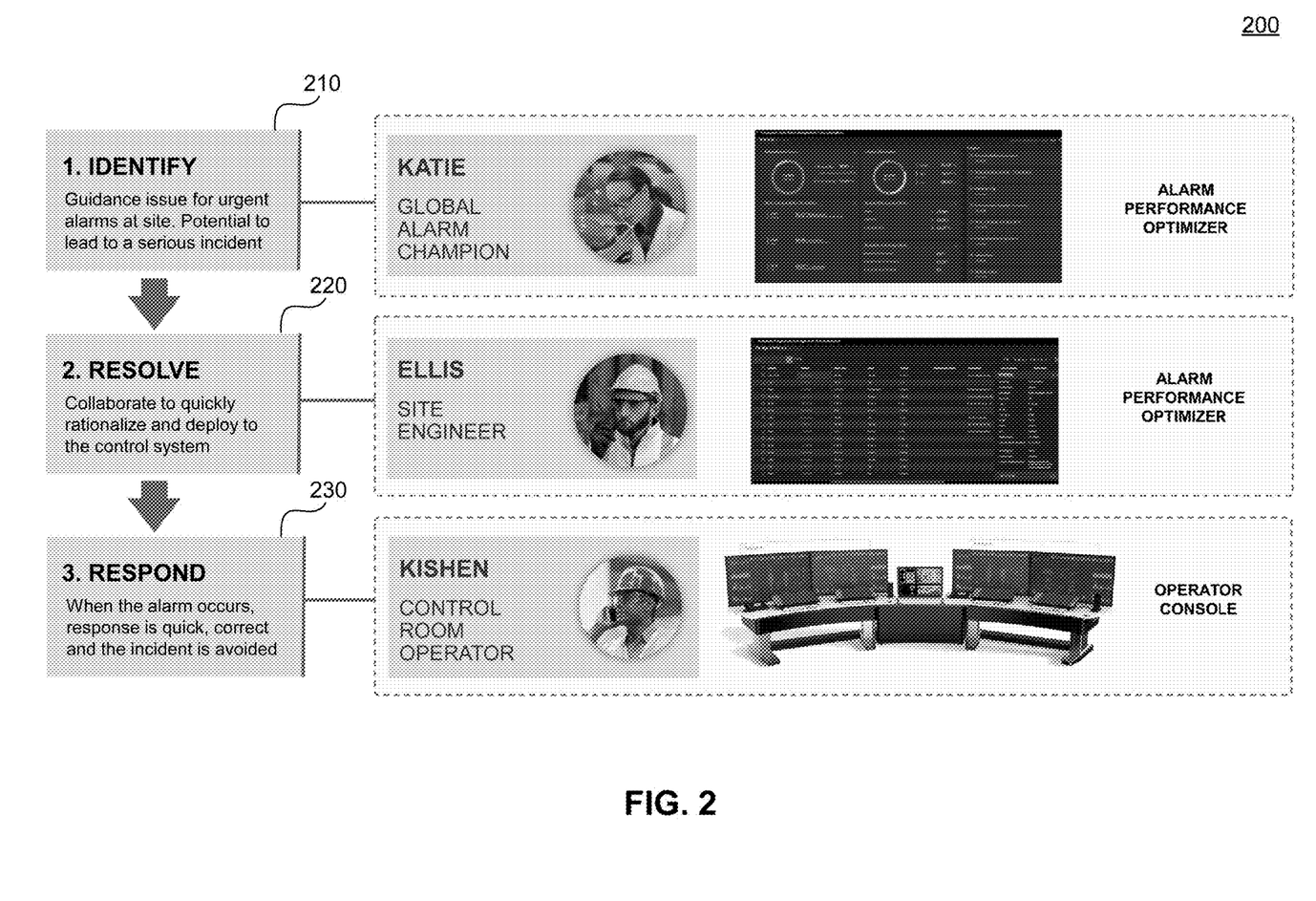
FIG. 2 is a block diagram illustrating an example use case of functionality related to an alarm performance optimizer (APO), according to some example embodiments.

FIG. 2 is a block diagram 200 illustrating an example use case of functionality related to an alarm performance optimizer (APO) 102, according to some example embodiments. At 210, a global alarm manager or champion may be able to use APO 102 to monitor how an organization is doing with regard to its alarm configuration health, and may use APO 102 to improve that alarm configuration health. For example, APO 102 may provide guidance and an interface for addressing urgent alarms, and may notify the alarm manger or alarm champion when alarms do not satisfy organizational or safety guidelines. The alarm champion may update alarm settings, changing priorities 126 and response information 128 or other alarm information 118, directly through a user interface 112. In some embodiments, the alarm champion may contact a site engineer to help resolve an alarm issue.

At 220, a site engineer may who is familiar with a particular facility 106 or set 110 may collaborate with the alarm champion and/or control room operator to ensure the alarm configuration information 118 is up-to-date date and correct. In some embodiments, if action on an alarm configuration 118 of a particular asset 110 is required, APO 102 may create a task or allow site engineer to create a task to be assigned to a control room operator. In some embodiments, the task may have access to response information 128 on how to correct or address the activated alarm.

At 230, when an alarm is activated, the control room operator may have access to APO 102 to determine how to respond to the alarm. Additionally, the alarm configuration change notification may also be triggered on the interfaces of the engineer and alarm champion. When the alarm configuration issue is resolved by one or more of the alarm champion, site engineer, and/or control room operator, APO 102 may update the user interface 112 accordingly so that all the individuals are seeing the most up to date information available.

In some embodiments, the site engineer may collaborate with the control room operator, through APO 102, to input what action(s) they took to resolve the alarm, and this information may be added to knowledge base 134, and/or made available as response information 128 for other similar alarms, or in case this alarm is activated again in the future.

For example, if a boiler stopped working, the control room operator may indicate that reset valve on the bottom of the boiler was switched, and this fixed the issue. This action response information 128 may then be added to knowledge base 134 and made available to other boiler alarms, such that if another boiler in another facility stops working, the engineer on that site can see that the control room operator had success with the reset switch. In some embodiments, a user may use the user interface 112 of APO 102 to quickly select to which other alarms to propagate this new response information 128.

In some embodiments, APO 102 may automatically identify similar alarms (e.g., for similar assets 110, such as boilers) and prompt a user if they want the new response information to be propagated to the identified set of alarms.

Figure 3:
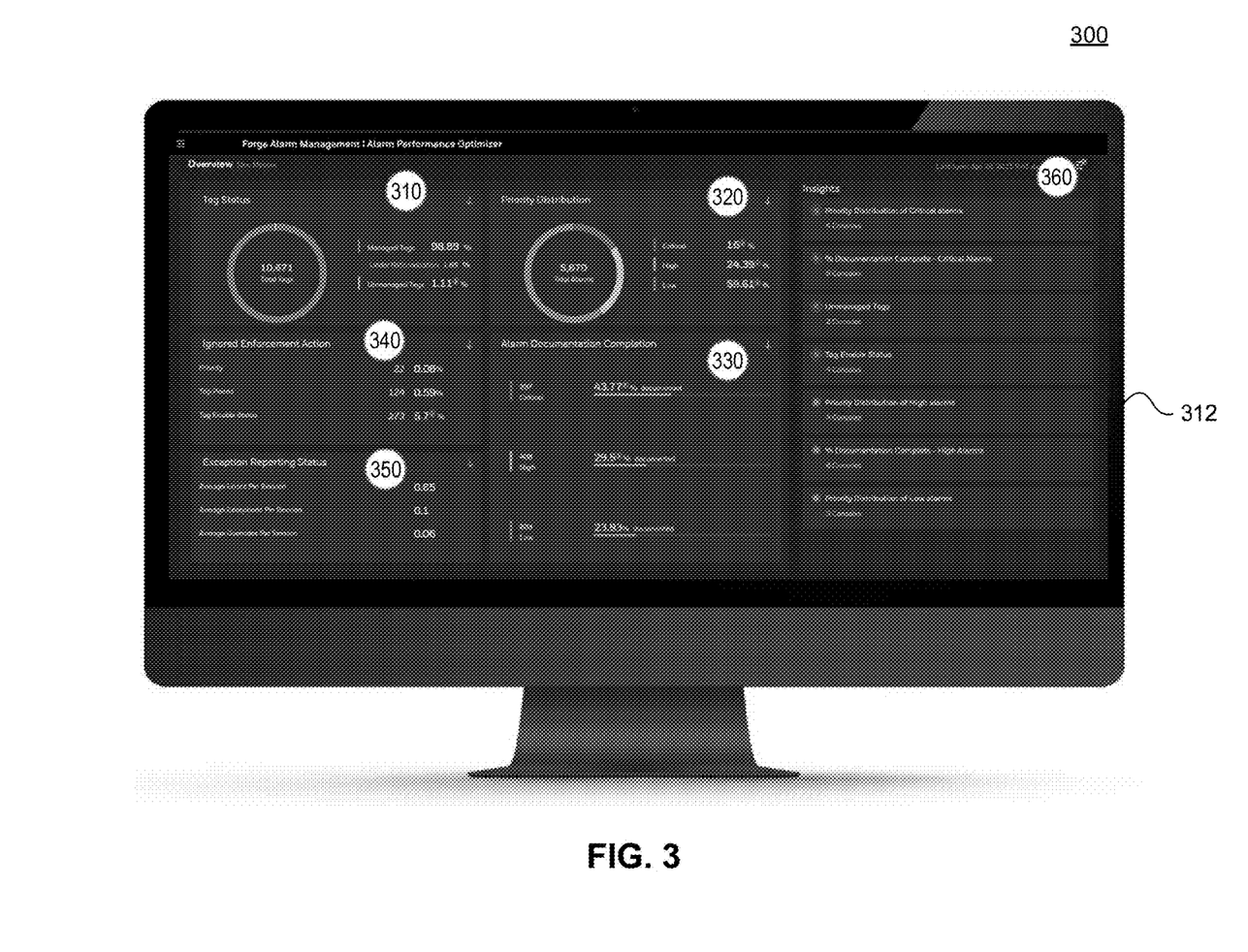
FIG. 3 illustrates a diagram of an example user interface for an alarm performance optimizer (APO) 102, according to some embodiments.

FIG. 3 illustrates a diagram 300 of an example user interface 312 for an alarm performance optimizer (APO) 102, according to some embodiments. The interface 312 may be divided into various sections 310-360 each of which display alarm configuration management and/or maintenance information from APO 102 that may not otherwise be available or viewable on a single interface without APO 102.

In section 310, a tag status is illustrated. The tag status may indicate which alarms have been reviewed by a committee of one or more persons familiar with the equipment and/or alarm settings who may be responsible for setting approved settings 120 for alarms 114. Or, for example, tag status may indicate which approved settings 120 have been verified against a set of safety or production guidelines.

For example, a chemical container may continuously or periodically stir chemicals, and may have alarm settings for stirring too fast or too slowly, depending on the type of chemicals. To ensure the alarms are properly set, one or more persons familiar with the chemicals and/or container may determine what are the too fast and too slow values for the alarms. When, the chemical container alarms are reviewed and set or confirmed through the user interface 116 of APO 102, the tag status may indicate that the tag or alarm has been reviewed, modified, or confirmed, and the tag status percentage may increase to indicate more tags have been reviewed/confirmed.

In some embodiments, the tag status may be associated with a timeframe. For example, the status of tags or alarms that were reviewed more than five years (or some other time frame) may be reset and marked as needing review automatically by APO 102 once the timeframe for periodic review has passed.

The managed tags may be those tags or alarms that have been reviewed/confirmed in view of safety guidelines, and the unmanaged tags may be those awaiting review. The 'under rationalization' label may indicate those tags or alarms that are currently being reviewed for safety and other protocols.

In some embodiments, if a user was to select the unmanaged tags label in section 310, APO 102 may provide a list of the unmanaged tags that need to be managed. The displayed unmanaged tags may be sorted or filtered by various criteria, including but not limited to location, priority, status, equipment, settings, etc.

In section 320 a priority distribution is illustrated. The priority distribution may visually illustrate a distribution of the configured alarms that have been approved or that are awaiting approval/review in whatever facilities are being monitored or that have been selected for viewing on the user interface 312. In other embodiments, the priority distribution may indicate if the distribution of the configured alarms is not proper (e.g., too many high, critical, or urgent alarms). For example, APO 102 may receive an organization threshold as to how many high alarms may be active at any given time. APO 102 may then indicate when the number of high alarms exceeds this threshold. There may be various categories of priorities in the distribution, such as: critical, high, and low.

In section 330, a documentation completion graphic or information may be displayed. Section 330 illustrates for which alarms documentation exists or that has been updated within a particular timeframe as may be required by organizational guidelines (which may be provided to APO 102). The documentation may include any information that may be relevant to maintaining or addressing the alarm. For example, documentation may include response information 128.

As illustrated, the documentation completion information may be filtered into different categories, such as: critical, high, and low (which may correspond to the categories illustrated in section 320). In other embodiments, an alarm manager 104 may create and set their own categories, such as location, equipment type, equipment age, etc. In the illustrated example, section 330 shows for what percentages of the alarms in each category documentation (e.g., response information 128) has been received or completed. In some embodiments, the interface 312 may also indicate whether these percentages are in meet/exceed or do not meet organization guidelines. For example, the organizational guidelines may indicate that the desire documentation for critical alarms is 50%, and APO 102 may flag for a user that the 43% documentation does not meet the suggested or required guidelines.

In section 340, ignored enforcement action information may be displayed. The ignored enforcement action information may indicate if particular settings were set as, or include a status 124, of unset or ignored, indicating that unauthorized or unapproved changes to actual settings 122 of the alarm cannot be detected (e.g., because there are out-of-date or not yet set approved settings 120 or other settings). For example, an alarm priority setting may be set to 'ignored' if someone changes the alarm priority settings in a control system 108. APO 102 may flag and identify the ignored alarms settings. Further, organizational guideline may indicate that the number of ignored alarm settings is 0 or 1%, and if the actual ignored alarm settings exceed this number, this may be flagged on the user interface 312 for the user.

In section 350, an exception reporting status may be displayed. The exception reporting status may indicate when an engineer or site manager overrides or changes an approved setting 120. For example, as noted above, an alarm 114 may have an approved setting 120 and an actual setting 122. The exception status may indicate those alarms 114 for which the actual setting 122 deviates from the approved setting 120, and that have not been authorized or the deviation has not yet been reviewed/approved. User interface 312 may enable a user to drill down and see which alarms in which locations and with regard to which assets the exceptions exist. User interface 312 may further enable a user to change the actual settings 122 of the alarms directly from user interface 312.

In section 360, insights may be provided. The insights may provide the alarm manager 104 with a curated list of actions that the alarm manager 104 (or other user logged into the APO 102) may take to improve the alarm statistics illustrated in sections 310-350 of the user interface 312. In some embodiments, APO 102 may automatically generate actions based on priority, providing the most critical or highest priority actions first. The priorities may be based on alarm priorities (e.g., any actions related to critical alarms are provided first, high priority alarms are second, and low priority alarms last).

In some embodiments, the priorities of the actions may be based on corporate guidelines, and how the statistics or values of sections 310-350 stack against the guidelines. For example, it may be part of the corporate guidelines that the distribution of configured critical alarms priority should not be more than 5% of the total configured alarm priorities. However, since the current value is 16% and this is out of line with the guidelines, and that may be listed as the first action.

In some embodiments, APO 102 may monitor what actions the alarm manager 104 takes with regard to the insights, and when the insights have been performed or addressed, APO 102 may automatically remove those from the insights list 360 and update the statistics accordingly.

Figure 4:
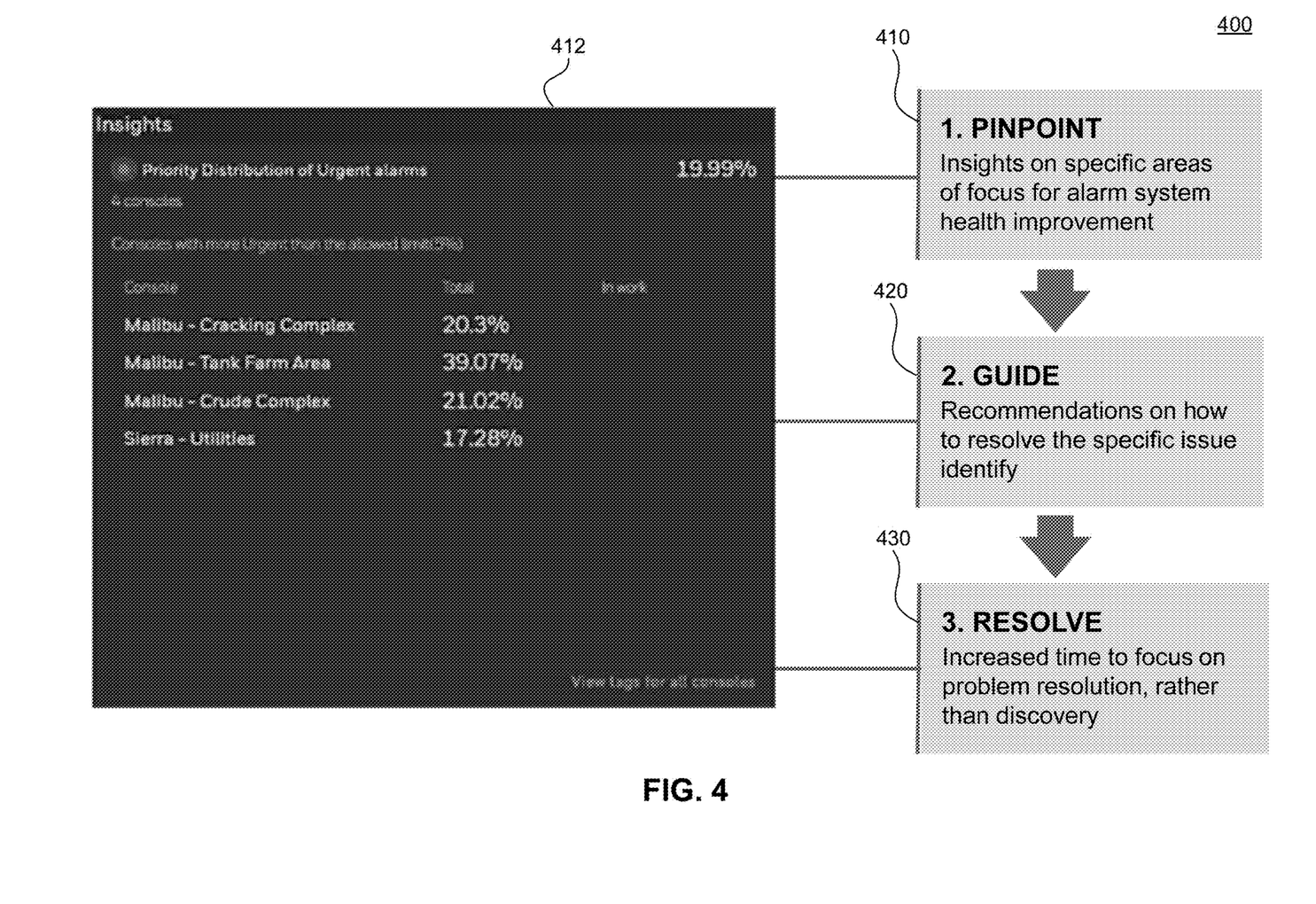
FIG. 4 illustrates a diagram of an example user interface related to alarm management and maintenance, according to some embodiments.

FIG. 4 illustrates a diagram 400 of an example user interface 412 related to alarm configuration management and maintenance, according to some embodiments. In an embodiment, an alarm manager 104 may select the first insight or action in section 360 of user interface 312. And in response to the selection, APO 102 may provide additional details regarding the selected insight or action, as illustrated in user interface 412.

As illustrated, the top line number of 19.99% may indicate the priority distribution of urgent alarms, that exceed the allowed limit of 5%. The four lower numbers may indicate which facilities or equipment were the biggest contributors to the top line number, the highest priority or most egregious offenders. This may allow the alarm manager 104 to quickly identify where action needs to be taken. In some embodiments, there may be other additional facilities or equipment (not shown) that may contributed to calculating the top line number. However, a user may request to see the additional facilities or equipment through 312 user interface.

User interface 412 may enable the alarm manager 104 quickly see where to focus his or her efforts and company resources to improve the top line number and help improve alarm maintenance and safety. As illustrated at 410, APO 102 may provide a user with the details necessary to perform an action or respond to an insight to improve alarm system health. At 420, APO 102 may recommend which facilities or alarms need the action, as illustrated in user interface 412. At 430, APO 102 may enable a user or alarm manager 104 to resolve or correct the issues direction from the user interface(s) of APO 102. Once an issue has been addressed or action has been taken, APO 102 may automatically update the alarms at the facilities and update the numbers displayed in the user interface 112 (e.g., by receiving notification of an alarm update status, or receiving a completion indication by the manager 104), to give the most update view of the alarm system health for an organization or facility 106.

Figure 5:
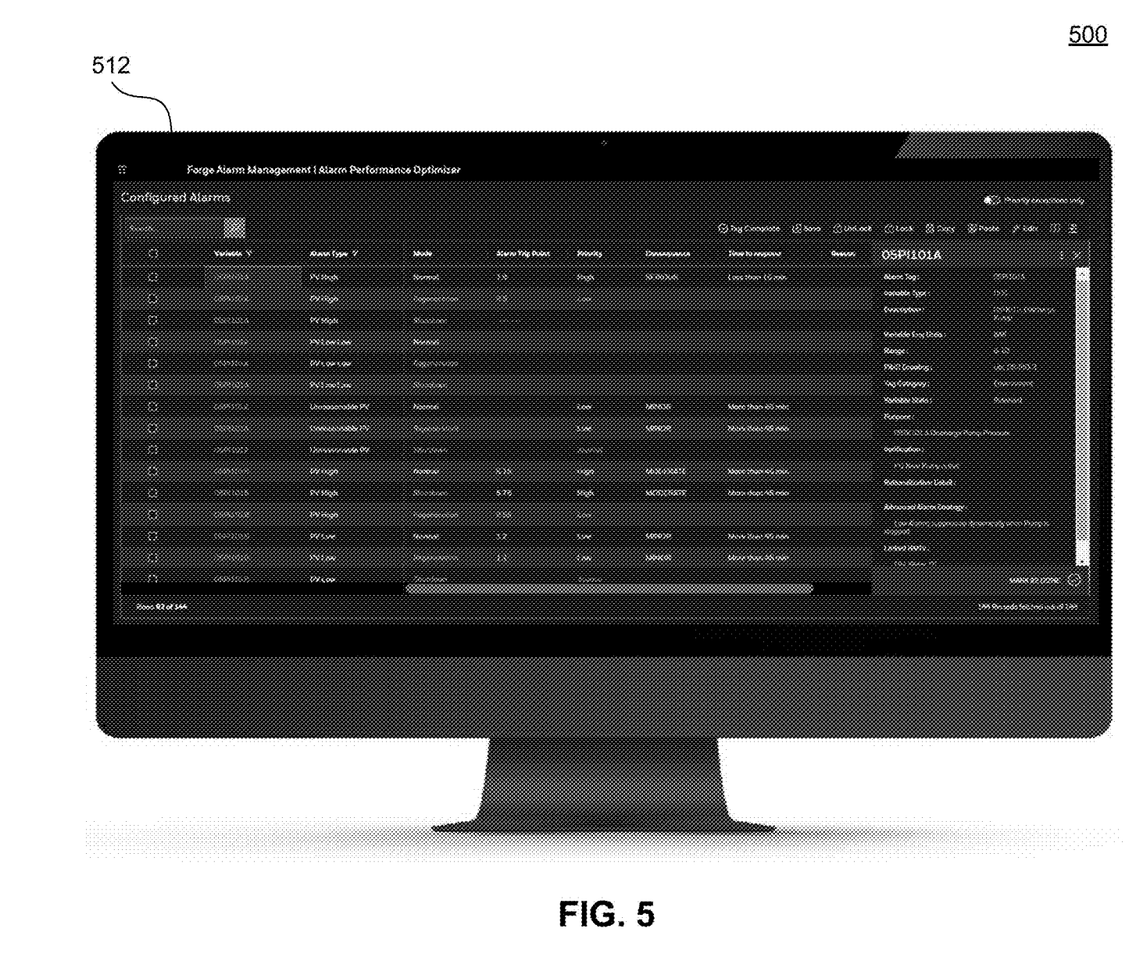
FIG. 5 illustrates a diagram of an example user interface for an alarm performance optimizer (APO), according to some embodiments.

FIG. 5 illustrates a diagram 500 of an example user interface 512 for an alarm performance optimizer (APO) 102, according to some embodiments. User interface 512 displays a list of different configured alarms that are being monitored by APO 102, and the various information that APO 102 has collected or has access to regarding the various alarms.

From this simple user interface 512, alarm manager 104 may edit, modify, or change the various alarm settings or information. APO 102 may allow alarm manager 104 to reorder and pin different columns in various locations to make viewing the data easier for the user. APO 102 may also allow the user to filter or sort the data.

In some embodiments, user interface 512 of APO 102 may also allow the user or alarm manager 104 to edit multiple rows (e.g., alarms) across one or more different facilities at the same time. For example, if there is a water tank at 3 different facilities, the alarm manager 104 may set alarm status for a first water tank through user interface 512. APO 102 may then enable alarm manager 104 to copy the alarm settings for the first water tank to the other similar water tanks.

In some embodiments, APO 102 may allow selecting similar assets 110 (e.g., water tanks) based on age, type, manufacturer, serial numbers, or other factor and when one alarm is updated or set, APO 102 may automatically or allow a user to copy those alarm configuration settings for the other similar assets 110. Or, for example, APO 102 may allow the user or alarm manager to apply the settings to other two similar water tanks (which may be listed or displayed in user interface 512). The user may select/deselect which tanks to apply the new settings to from a list, thus simultaneously updating the alarm settings for multiple assets 110 across different facilities 106 that may be managed by different control systems 108. In some embodiments, APO 102 may automatically detect (and flag for a user via a user interface 512) improper priority configurations for an alarm and allow a user to correct those settings.

Figure 6:
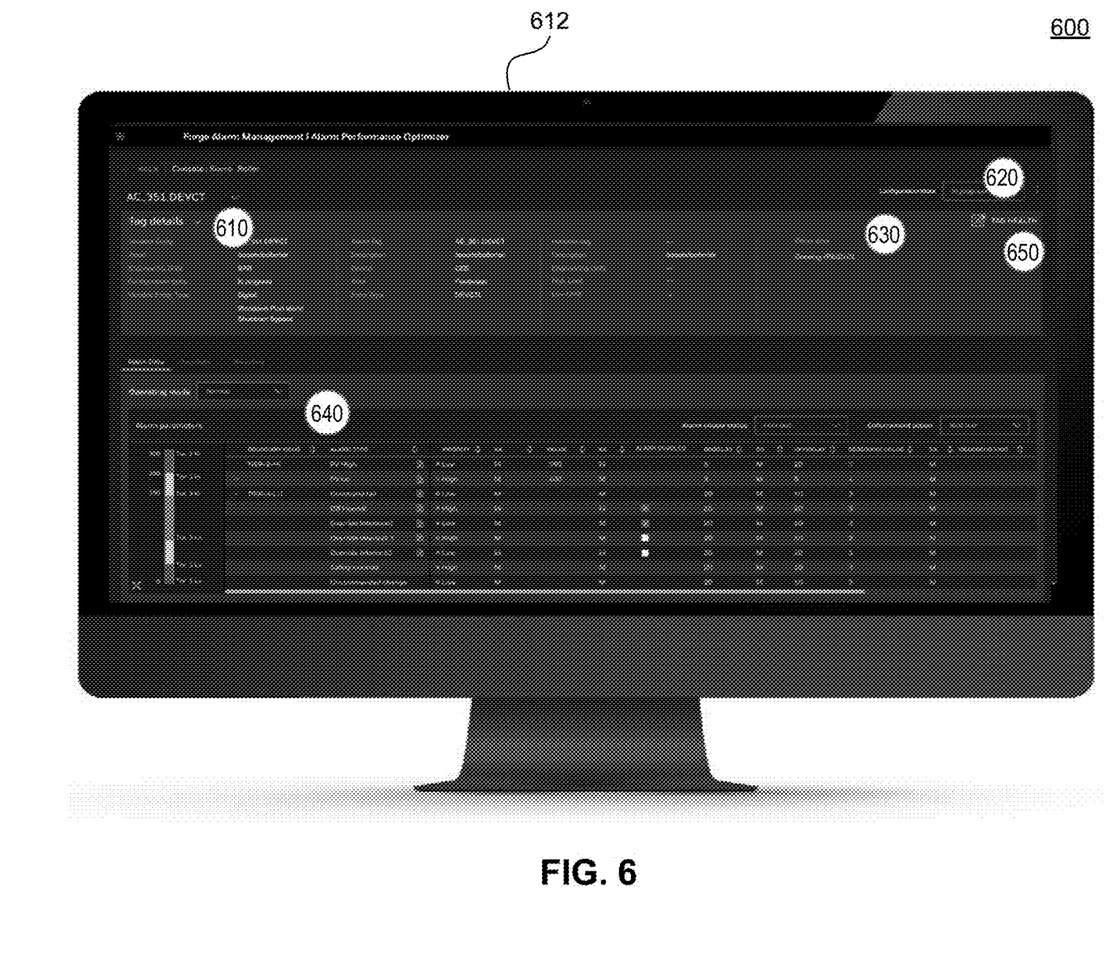
FIG. 6 illustrates a diagram of another example user interface for an alarm performance optimizer (APO), according to some embodiments.

FIG. 6 illustrates a diagram 600 of another example user interface 612 for an alarm performance optimizer (APO) 102, according to some embodiments. Section 610 may display high level tag (alarm) data or information such as its location or facility 106, the equipment or asset 110, priority status, control panel 108 information, etc.

Section 620 may display a configuration state of the selected alarm of 610. The configuration state may indicate a state of the alarm, example status include: managed, rationalized, in progress, in review, unmanaged, etc.

Section 630 may display which supporting documents (if any) are available for the alarm 114. The supporting documents may be documentation about the asset, equipment, or machinery associated with the alarm, response information 128, documentation by previous alarm managers about the alarm settings, links, videos, tutorials, etc.

Section 640 may display alarm configuration details for the alarm or tag displayed in section 610. The alarm details or configuration details may include settings for alarm activation and response history, or a history of when and by whom the alarm settings were updated.

Section 650 may display a tag health related to the alarm. The tag health may indicate whether the current alarm settings satisfy the current guidelines. In some embodiments, the tag health may indicate a list of actions or insights that may be performed to improve the health of the displayed tag and its configured alarms. In the illustrated example, there may be nine action items that a user may take to improve the health of the displayed tag. In an embodiment, if the user selects tag health from user interface 612, a list of the actions or insights may be displayed for the user.

Figure 7:
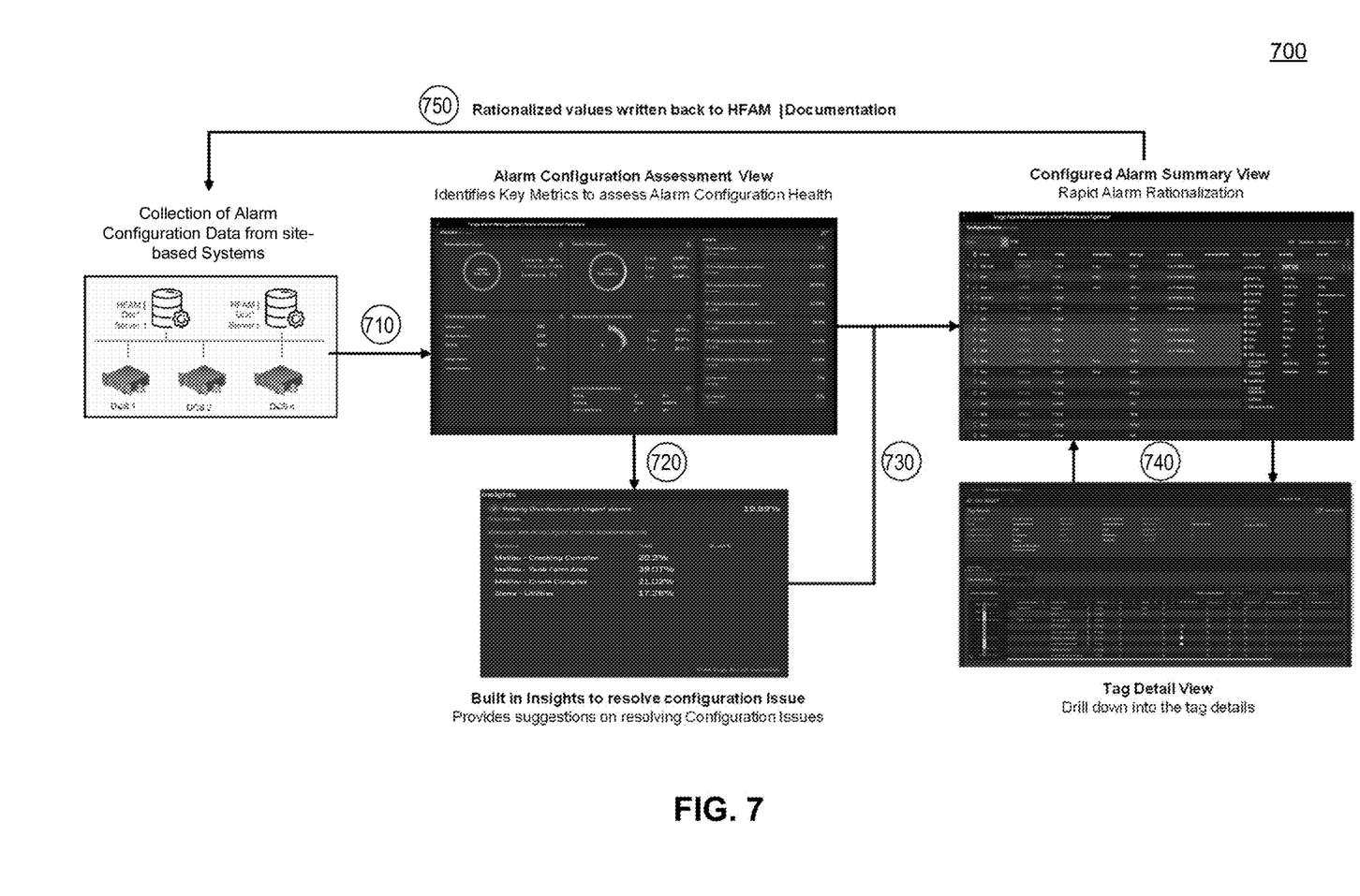
FIG. 7 illustrates an example workflow between various interfaces of an alarm performance optimizer (APO), according to some example embodiments.

FIG. 7 illustrates an example workflow 700 between various interfaces of an alarm performance optimizer (APO) 102, according to some example embodiments.

At 710 data may be received by APO 102 from control systems 108 that are used to operate and/or monitor various assets 110 across one or more facilities 106. APO 102 may process the data: identifying and calculating key metrics, assessing the current alarm configuration health, and displaying the metrics and other alarm configuration information in a user interface (e.g., 312). User interface 312 may provide an alarm configuration assessment view for an alarm manager 104.

At 720, the alarm manager 104 may select an insight, and APO 102 may provide more details about the selected insight(s) or action(s) from user interface 312. APO 102 may present the additional details in a user interface 412. The alarm manager 104 may use the user interface 412 to resolve any configuration issues.

At 730 and 740, the alarm manager 104 may interact with various alarms, and update alarm values or setting using user interface 512 and user interface 612. At 750, any updated values or modifications 130 may be communicated back to the control systems 108 and used to monitor assets 110. New alarm information, after the update, may then be retrieved or received by APO 102 at 710 once again.

Figure 9:
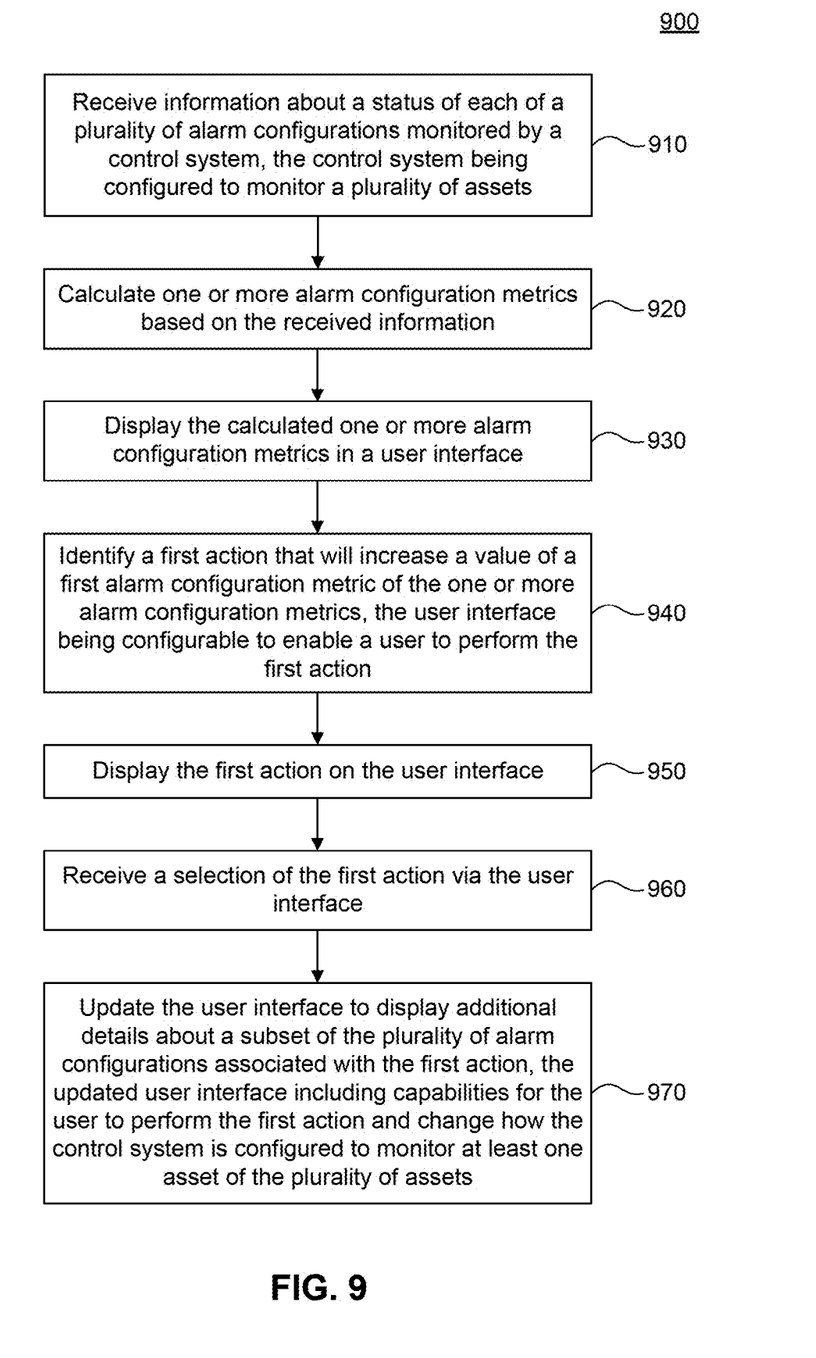
FIG. 9 is a flowchart illustrating example functionality of alarm performance optimizer (APO), according to some embodiments.

FIG. 9 is a flowchart 900 illustrating example functionality of alarm performance optimizer (APO), according to some embodiments. Method 900 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 9, as will be understood by a person of ordinary skill in the art. Without limiting method 900, method 900 is described with reference to elements in the figures.

At 910, information about a status of each of a plurality of alarm configurations monitored by a control system is received, the control system being configured to monitor a plurality of assets. For example, alarm aggregator 116 may receive information from control systems 108A-C which may be monitoring assets 110A-E across facilities 106A-B.

At 920, one or more alarm configuration metrics are calculated based on the received information. For example, APO 102 may calculate various metrics that indicate a health of the alarm systems. Example metrics includes but are not limited to tag management status, configured priority distribution of alarms, alarm documentation completion, alarm settings with ignored enforcement action, and exception reporting health.

At 930, the calculated one or more alarm configuration metrics are displayed in a user interface. For example, user interface 312 may display various metrics in sections 310-350.

At 940, a first action that will increase a value of a first alarm configuration metric of the one or more alarm metrics is identified, the user interface being configurable to enable a user to perform the first action. For example, user interface 312 may display a set of insights or actions in section 360, the actions being intended to increase the value of one or more of the metrics displayed in one or more of sections 310-350.

At 950, the first action is displayed on the user interface. For example, user interface 312 may display selectable insights or actions in section 360 that a user is authorized to perform with respect to one or more alarm configurations.

At 960, a selection of the first action via the user interface is received. For example, an alarm manager may select the first action in section 360 of user interface 312.

At 970, the user interface is updated to display additional details about a subset of the plurality of alarm configurations associated with the first action, the updated user interface including capabilities for the user to perform the first action and change how the control system is configured to monitor at least one asset of the plurality of assets. For example, responsive to the selection, APO 102 may display user interface 412 that includes additional details about the selected action.

APO 102 may also display or make available user interfaces 512 and 612, either of which a user or alarm manager 104 may use to update alarm settings across one more alarms. APO 102 may then provide the updated values to control systems 108A-C or otherwise configure control systems 108A-C with the new alarm configuration values, such that the control systems 108A-C are monitoring assets 110A-E in view of the new alarm values. Alarm aggregator 116 may receive updated information and refresh user interface 312 with new alarm statuses and health statistics or metrics.

Figure 8:
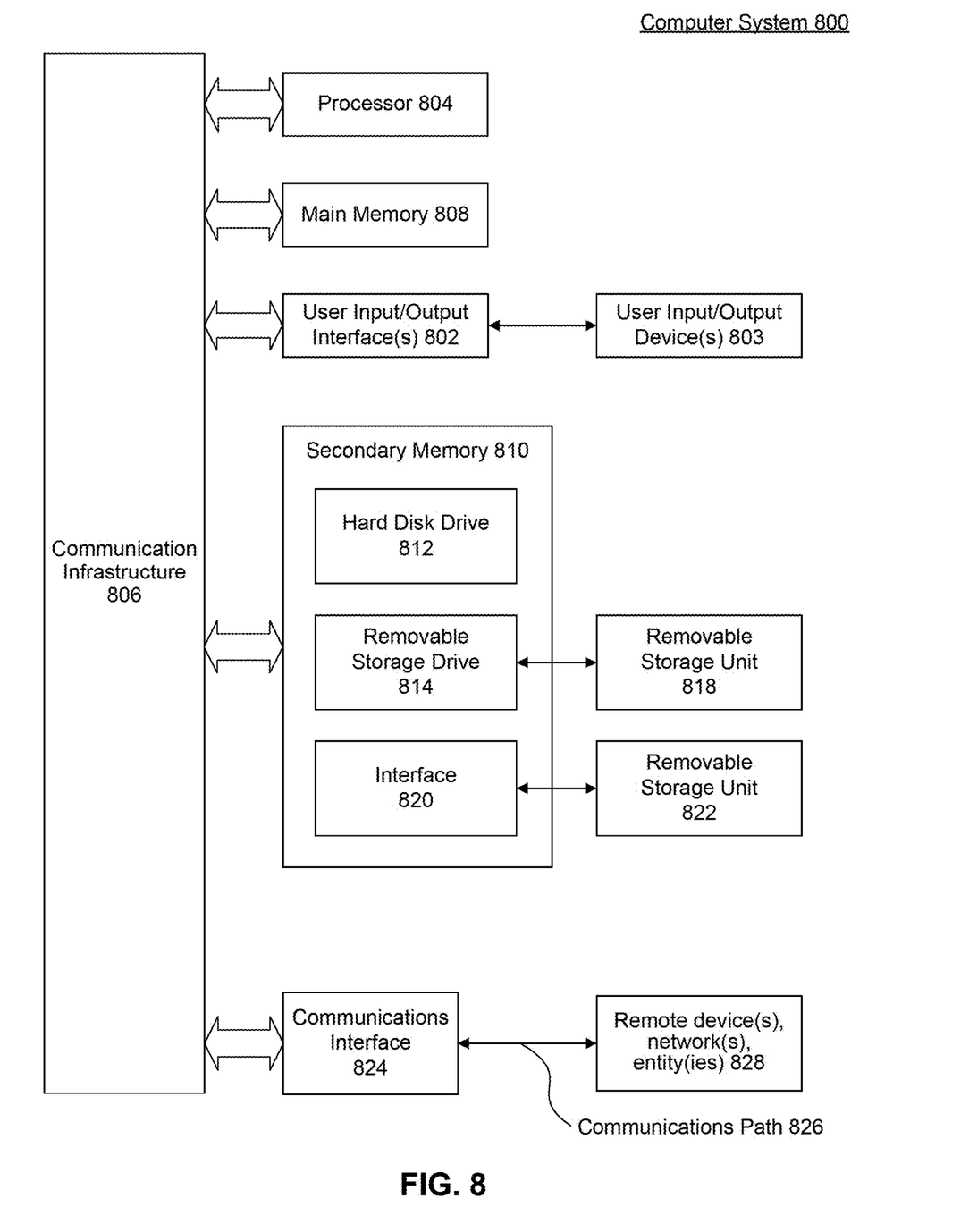
FIG. 8 illustrates an example computer system useful for implementing various embodiments.

Various embodiments may be implemented, for example, using one or more well-known computer systems, such as computer system 800 shown in FIG. 8. One or more computer systems 800 may be used, for example, to implement any of the embodiments discussed herein, as well as combinations and sub-combinations thereof.

Computer system 800 may include one or more processors (also called central processing units, or CPUs), such as a processor 804. Processor 804 may be connected to a communication infrastructure or bus 806.

Computer system 800 may also include customer input/output device(s) 803, such as monitors, keyboards, pointing devices, etc., which may communicate with communication infrastructure 806 through customer input/output interface(s) 802.

One or more of processors 804 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 may also include a main or primary memory 808, such as random access memory (RAM). Main memory 808 may include one or more levels of cache. Main memory 808 may have stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 may include a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 may read from and/or write to removable storage unit 818.

Secondary memory 810 may include other means, devices, components, instrumentalities or other approaches for allowing computer programs and/or other instructions and/or data to be accessed by computer system 800. Such means, devices, components, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 may enable computer system 800 to communicate and interact with any combination of external devices, external networks, external entities, etc. (individually and collectively referenced by reference number 828). For example, communication interface 824 may allow computer system 800 to communicate with external or remote devices 828 over communications path 826, which may be wired and/or wireless (or a combination thereof), and which may include any combination of LANs, WANs, the Internet, etc. Control logic and/or data may be transmitted to and from computer system 800 via communication path 826.

Computer system 800 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 800 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 800 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 8. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method comprising:
   receiving information about a status of each of a plurality of alarm configurations monitored by a control system, the control system being configured to monitor a plurality of assets;
   calculating one or more alarm configuration health metrics based on the received information;
   displaying the calculated one or more alarm configuration health metrics in a user interface;
   identifying a first action that will increase a value of a first alarm metric of the one or more alarm configuration health metrics, the user interface being configurable to enable performing the first action;
   displaying the first action on the user interface;
   receiving a selection of the first action via the user interface; and
   responsive to receiving the selection for the first action, updating the user interface to display additional details about a subset of the plurality of alarm configurations associated with the first action, the updated user interface including capabilities for performing the first action and changing a configuration of the control system, the configuration being related to monitoring at least one asset of the plurality of assets.

2. The method of claim 1, further comprising:
   receiving a new value via the updated user interface for a first alarm configuration of the plurality of alarm configurations.

3. The method of claim 2, further comprising:
   communicating the new value to the control system configured to monitor at least a first asset of the plurality of assets based on the new value.

4. The method of claim 2, wherein the updated user interface provides an option to apply the new value simultaneously to multiple alarm configurations of the plurality alarms.

5. The method of claim 4, further comprising:
   communicating the new value to the control system configured to monitor multiple alarms of the plurality of assets based on the new value.

6. The method of claim 1, wherein the plurality of assets are deployed across a plurality of facilities across different geographic areas.

7. The method of claim 1, further comprising:
   displaying, on the user interface, a value for each the plurality of alarm configurations indicating whether response guidelines have been received for the alarm configuration, the response guidelines being accessible to personnel responsible for addressing an alarm when activated.

8. A system comprising at least one processor, the at least one processor configured to perform operations comprising:

receiving information about a status of each of a plurality of alarm configurations monitored by a control system, the control system being configured to monitor a plurality of assets;

calculating one or more alarm configuration health metrics based on the received information;

displaying the calculated one or more alarm configuration health metrics in a user interface;

identifying a first action that will increase a value of a first alarm metric of the one or more alarm configuration health metrics, the user interface being configurable to enable performing the first action;

displaying the first action on the user interface;

receiving a selection of the first action via the user interface; and responsive to receiving the selection for the first action, updating the user interface to display additional details about a subset of the plurality of alarm configurations associated with the first action, the updated user interface including capabilities for performing the first action and changing a configuration of the control system, the configuration being related to monitoring at least one asset of the plurality of assets.

9. The system of claim 8, the operations further comprising:

receiving a new value via the updated user interface for a first alarm configuration of the plurality of alarm configurations.

10. The system of claim 9, the operations further comprising:

communicating the new value to the control system configured to monitor at least a first asset of the plurality of assets based on the new value.

11. The system of claim 9, wherein the updated user interface provides an option to apply the new value simultaneously to multiple alarm configurations of the plurality alarms.

12. The system of claim 11, the operations further comprising:

communicating the new value to the control system configured to monitor multiple alarms of the plurality of assets based on the new value.

13. The system of claim 8, wherein the plurality of assets are deployed across a plurality of facilities across different geographic areas.

14. The system of claim 8, the operations further comprising:

displaying, on the user interface, a value for each the plurality of alarm configurations indicating whether response guidelines have been received for the alarm configuration, the response guidelines being accessible to personnel responsible for addressing an alarm when activated.

15. A non-transitory computer-readable medium having instructions stored thereon that, when executed by at least one computing device, cause the at least one computing device to perform operations comprising:

receiving information about a status of each of a plurality of alarm configurations monitored by a control system, the control system being configured to monitor a plurality of assets;

calculating one or more alarm configuration health metrics based on the received information;

displaying the calculated one or more alarm configuration health metrics in a user interface;

identifying a first action that will increase a value of a first alarm metric of the one or more alarm configuration health metrics, the user interface being configurable to enable performing the first action;

displaying the first action on the user interface;

receiving a selection of the first action via the user interface; and responsive to receiving the selection for the first action, updating the user interface to display additional details about a subset of the plurality of alarm configurations associated with the first action, the updated user interface including capabilities for performing the first action and changing a configuration of the control system, the configuration being related to monitoring at least one asset of the plurality of assets.

16. The non-transitory computer-readable medium of claim 15, the operations further comprising:

receiving a new value via the updated user interface for a first alarm configuration of the plurality of alarm configurations.

17. The non-transitory computer-readable medium of claim 16, the operations further comprising:

communicating the new value to the control system configured to monitor at least a first asset of the plurality of assets based on the new value.

18. The non-transitory computer-readable medium of claim 16, wherein the updated user interface provides an option to apply the new value simultaneously to multiple alarm configurations of the plurality alarms.

19. The non-transitory computer-readable medium of claim 18, the operations further comprising:

communicating the new value to the control system configured to monitor multiple alarms of the plurality of assets based on the new value.

20. The non-transitory computer-readable medium of claim 15, wherein the plurality of assets are deployed across a plurality of facilities across different geographic areas.

* * * * *